United States Patent [19]

Koerner

[11] Patent Number: 4,734,627
[45] Date of Patent: Mar. 29, 1988

[54] BRUSHLESS D.C. MOTOR HAVING TWO CONDUCTORS PER PHASE ENERGIZED ALTERNATELY BY COMPLEMENTARY-CONDUCTIVITY-TYPE SEMICONDUCTORS CONTROLLED BY THE SAME ROTOR-POSITION SIGNAL, AT TIMES MODIFIED BY A COMPENSATING TECHNIQUE

[75] Inventor: Ernst M. Koerner, St. Georgen, Fed. Rep. of Germany

[73] Assignee: Papst-Motoren GmbH & Co. KG, St. Georgen, Fed. Rep. of Germany

[21] Appl. No.: 674,548

[22] Filed: Nov. 26, 1984

[30] Foreign Application Priority Data

Nov. 28, 1983 [DE] Fed. Rep. of Germany ....... 3342986

[51] Int. Cl.$^4$ .......................................... H02K 29/08
[52] U.S. Cl. ..................................... 318/254; 318/138; 318/439
[58] Field of Search ................... 318/138, 254 A, 254, 318/439

[56] References Cited

U.S. PATENT DOCUMENTS

| | | | |
|---|---|---|---|
| 4,119,895 | 10/1978 | Muller | 318/138 X |
| 4,374,347 | 2/1983 | Muller | 318/254 X |
| 4,379,984 | 4/1983 | Muller | 318/138 X |
| 4,473,781 | 9/1984 | Nielsen | 318/138 X |

FOREIGN PATENT DOCUMENTS

0679095 1/1964 Canada ............................. 318/138

Primary Examiner—Bentsu Ro
Attorney, Agent, or Firm—Theodore J. Koss, Jr.

[57] ABSTRACT

A one-phase motor has two conductors energized alternately via respective pnp and npn transistors and from the same output of a Hall-IC, without polarity inversion. When the Hall signal goes high the first transistor goes conductive and the second non-conductive, or vice versa. Capacitive delay elements slow down the switching-ON and -OFF of the two transistors. The capacitive delay elements have the undesired effect that, in response to the self-same change in the value of the Hall signal, the signal at the base of the OFF transistor changes comparatively quickly to switch the same ON, whereas the signal at the base of the ON transistor changes comparatively slowly to switch the latter off, which can lead to both being briefly conductive simultaneously, leading to voltage spikes and precluding safe dissipation of inductive energy in the transistors themselves. A coupling capacitor connects the transistors at their bases and has a capacitance value such that it develops and maintains a substantially fixed potential difference between the two bases. This causes the change in base potential at the ON-going transistor to be retarded in dependence upon the otherwise slower change occurring in the base potential of the OFF-going transistor, and furthermore causes the OFF-going transistor to become non-conductive before the ON-going transistor becomes conductive. This too helps to make it safe to dissipate in the OFF-going transistor the stored energy of the associated wound conductor.

27 Claims, 6 Drawing Figures

BRUSHLESS D.C. MOTOR HAVING TWO CONDUCTORS PER PHASE ENERGIZED ALTERNATELY BY COMPLEMENTARY-CONDUCTIVITY-TYPE SEMICONDUCTORS CONTROLLED BY THE SAME ROTOR-POSITION SIGNAL, AT TIMES MODIFIED BY A COMPENSATING TECHNIQUE

BACKGROUND OF THE INVENTION

The invention concerns brushless direct-current motors of the type having two conductors per phase, the two conductors of a phase being energized in alteration to reverse the polarity of the stator field at the appropriate times; this is in contrast to brushless d.c. motors of the type where the stator-field polarity reversal is accomplished using one conductor per phase and simply reversing the direction of current flow within that one conductor. In motors of the type in question, each of the two conductors is connectable across the power-supply lines for energization by means of a respective first or a respective second semiconductor control means, such as a Darlington transistor, the two semiconductor control means being of opposite conductivity types and receiving at their respective control input terminals nominally identical control voltages furnished, via an intermediate network of passive elements, from single output of a rotor-position sensor such as a Hall-IC. Because the two semiconductor control means are of opposite conductivity types, when the e.g. Hall voltage goes high this renders the first one conductive and the second one non-conductive, for example, and then when the Hall voltage goes low this renders the second one conductive and the first one non-conductive; i.e. the use of opposite-conductivity-type semiconductor control means being what makes it possible to render them conductive alternately using the output signal from a single Hall-element output without the need to transmit the Hall signal to one of the two semiconductor control means through the intermediary of an active-element polarity inverter.

Such a motor is known from FIG. 7 of U.S. Pat. No. 4,374,347. There, both semiconductor control means have means for delayed switching. The two semiconductor control means are, there, complementary Darlington transistors which are each provided with a Miller capacitor (between collector and base), in order to avoid HF oscillations. Such a Miller capacitor produces a—usually desirable—delay upon switching the respective transistor ON and OFF. It has in practice been shown that the delay upon switching OFF is greater than the switch-ON delay. If now there is present between the two conductors of a stator-winding phase a certain amount of inductive coupling, which is almost necessarily the case with an electric motor by virtue of the magnetic circuit, then a delayed switching OFF of the one transistor and a rapid switching ON of the other produces a marked rise of the current in the winding conductor that is being switched OFF, before this current is finally switched OFF. Such current spikes, however, lead to high-frequency interference, to undesirable motor noise, and they cause an intensified loading of the semiconductor switching means that is being switched OFF.

SUMMARY OF THE INVENTION

It is therefore an object of the invention to avoid disadvantages of the known brushless direct-current motor.

This object is achieved in accordance with the invention by coupling together the control inputs of the first and second semiconductor control means in such a manner that, when the output signal of the rotor-position sensor changes state, the resulting changes in the control signals at the control inputs of the two semiconductor control means are caused to exhibit substantially the same variation. Thus it cannot occur that the one potential rises (or drops) substantially quicker than the other. As a result the switching operations at the two semiconductor control means become forced into a predetermined relationship in time relative to each other and one avoids undesired current spikes in the two wound conductors of a phase shortly before the completion of switching OFF of one of them. With such an arrangement, with suitable dimensioning, it is simultaneously achieved that the inductive energy stored in the OFF-going condcutor can be safely converted into heat in the respective semiconductor control means, so that a separate storage capacitor in the motor can be dispersed with. Such storage capacitors, such as shown e.g. in the above mentioned U.S. Pat. No. 4,374,347, must have relatively high capacitance values and therefore must be designed as electrolytic capacitors which exhibit only a limited lifetime. In the case of simple and cheap types this lifetime can be shorter than the expected mechanical lifetime of the motor. Furthermore, such capacitors require relatively much space in the motor. For the inventive A.C.-coupling of the control outputs, however, one requires only a small capacitor which can be designed as a ceramic capacitor and which therefore has a very long lifetime which is as a rule greater than the mechanical lifetime of the motor, so that on balance by means of the invention even the lifetime of the motor can be increased, to the value determined by its mechanical lifetime. Also the circuit for an inventive motor can be constructed very extraordinarily small, inasmuch as the circuit has only a few circuit elements, which furthermore are for the most part resistors, which makes possible the construction of extremely compact motors. Such a circuit can e.g. be constructed as a printed circuit upon a circular annular plate with an outer diameter of 43 mm and an inner diameter of 22 mm, this annular member—mounted—having a maximum thickness of 4 mm, only the Hall-IC and possibly a PTC resistor projecting beyond the same by some millimeters. This is especially significant for fans having small dimensions, whose construction is for the first time by means of the invention made possible with integrated electronics.

Further details and advantageous modifications of the invention are to be had from the exemplary embodiment described below and shown in the drawing, in no way to be understood as limiting the invention, as well as from the dependent claims.

DESCRIPTION OF THE PREFERRED EMBODIMENTS

Figures 1A, 1B:
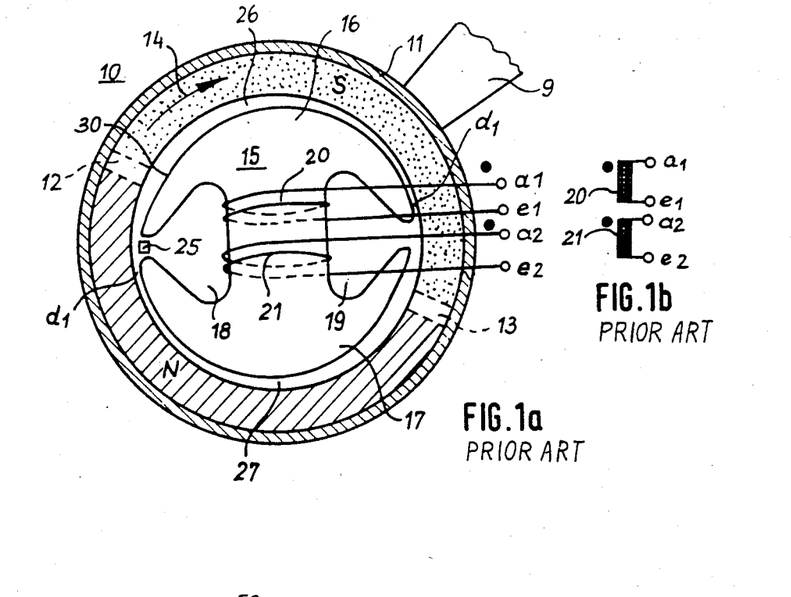
FIGS. 1a and 1b schematically depict a two-pole, one-phase, two-conductor brushless direct-current motor of known construction, such as can be used in the case of the invention.

FIG. 1 depicts an external-rotor motor 10 of known construction with an external two-pole rotor 11, designed as a continuous magnet ring, whose magnetization is designed nearly trapezoidal, namely with a practically constant induction in the region of the poles, and with narrow pole gaps.

In FIG. 1 the locations with practically constant induction for the north pole are symbolically indicated by hatching, and for the south pole with gray shading. The rotor 11 is designed as a radially magnetized permanent-magnet member, e.g. made of barium ferrite or a "rubber magnet". The two pole gaps are likewise symbolically indicated and denoted with 12 and 13. FIG. 1 shows the rotor 11 in one of its two stable rest positions, which it can assume in the currentless state of the motor. These rest positions are determined by the shape of the air gap and the shape of the magnetization. In operation the rotor 11 turns in the direction of the arrow 14. A fan blade is denoted by 9 and is directly secured on the rotor 11.

The stator 15 of the motor 10 is configured as a double-T-anchor with an upper pole 16 and a lower pole 17, both of which have approximately the outline of an umbrella, i.e. each one extending circumferentially for almost the whole of the pole arc, and including between themselves two slots 18 and 19 in which are arranged the two conductors 20 and 21 of a two-conductor, one-phase stator winding. The terminals of the conductor 20 are denoted by al and el, those of the conductor 21 by a2 and e2. The conductors 20 and 21 have equal numbers of turns and the same winding sense, i.e. when a direct current flows from al to e1 there results identically the same magnetization of the stator 15 as when the same direct current flows from a2 to e2. In this case there results the dot representation according to FIG. 1b; i.e., the wound conductor 20 has the dot at terminal a1, the wound conductor 21 at the terminal a2. This representation is employed in the same way in the subsequent Figures. The conductors 20 and 21 can in preferred manner, in accordance with the teaching of DE-OS No. 22 39 167, be wound bifilar, in order to obtain a close inductive coupling between them.

Rotor-position-dependent sensing means, here a Hall-IC 25, are arranged on the stator 15 at an angular position substantially corresponding to the opening of the slot 18 or being some degrees offset relative to this opening opposite the rotation direction 14, namely counterclockwise. The Hall-IC 25 is here controlled by the magnetic field of the permanent-magnet rotor 11 and, in dependence upon rotor position, generates a signal which is either high or low, i.e. constituting upon rotation of the rotor 11 practically a rectangular signal whose high and low intervals are each about 180°-e1. long.

The air gap 26 above the stator pole 16 and the air gap 27 above the stator pole 17 are designed in a special way. Beginning from the slot 18 the air gap 26 monotonically increases, measured in the rotation direction 14, for about 10-15 degrees up to a first location 30 at which it reaches its maximum. From there on, the air gap 26 monotonically decreases for about 170 degrees electrical until about the opening of the slot 19 where as illustrated it reaches its minimum value d1. As illustrated the air gap 27 has an identical variation. This air gap shape, in cooperation with the described type of magnetization of the rotor 11, effects during operation the development of a reluctance torque of predetermined shape, such as described in detail in DE-PS No. 2,346,380, to which reference is made for the sake of brevity. Naturally, instead of a motor of the type depicted in FIG. 1, also a flat motor with ironless stator can be employed e.g. in accordance with DE-OS No. 2,239,167, or e.g. an internal-rotor motor, or a motor with a higher number of poles such as shown e.g. by DE-OS No. 28 35 210 in FIGS. 2 or 9. Thus the invention is in no way limited to the embodiment of FIG. 1, and the latter instead serves only to make the invention understandable with reference to a concrete example.

Figure 2:
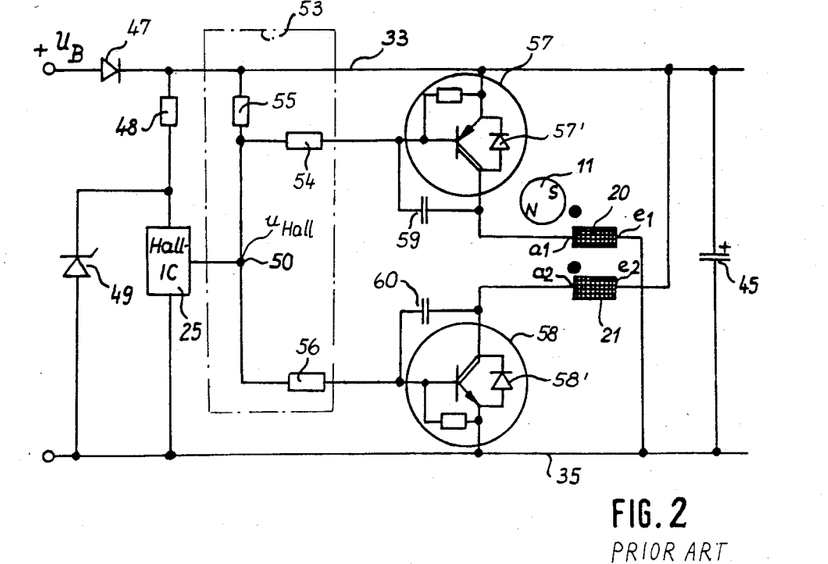
FIG. 2 depicts the construction of a prior-art circuit for controlling the commutation of the motor of FIG. 1.

FIG. 2 depicts a circuit for the motor of FIG. 1, such as known from e.g. FIG. 7 of the already mentioned U.S. Pat. No. 4,374,347. A plus line 33 is connected via a diode 47 to a positive operating voltage $U_B$, e.g. of a battery, and a minus line 35 can be connected to e.g. the minus pole of this battery (e.g. 12, 24 or 48 V). The Hall-IC 25 is connected with one terminal to the minus line 35 and with its other terminal is connected via a resistor 48 to the plus line 33. Connected parallel to it is a zener diode 49 which regulates the voltage on the Hall IC 25 to e.g. 5 V. The output 50 of the Hall-IC 25 is connected to a resistor network 53 with three resistors 54, 55, 56. The resistor 54 leads from the output 50 to the base of a pnp Darlington transistor 57; the resistor 55 from the output 50 to the plus line 33; and the resistor 56 leads from the output 50 to the base of an npn transistor 58 which is of conductivity type complementary to the transistor 57. The emitter of the transistor 57 is connected with the plus line 33, its collector with the terminal a1 of the wound conductor 20, and antiparallel to it is connected a diode 57'. The terminal e1 of the wound conductor 20 is connected to the minus line 35.

The emitter of the transistor 58 is connected to the minus line 35; its collector is connected to the terminal a2 of the wound conductor 21, whose other terminal e2 is connected to the plus line 33. A diode 58' is connected anti-parallel to the transistor 58. A storage capacitor 45 is connected between the lines 33 and 35. The wound conductors 20 and 21 are, by virtue of bifilar winding, closely coupled. With regard to the terminals a1, e1 and a2, e2, reference is made to the representation according to FIGS. 1a and 1b. The transistor 57 is provided with a Miller capacitor 59 connected between its collector and base. Likewise the transistor 58 is provided with a Miller capacitor 60 connected between its collector and base. These Miller capacitors, which e.g. have a capacitance value of 150 pF, effect a negative-feedback coupling from the collector to the base and slow the switching ON and switching OFF of the transistors 57 and 58, in this way reducing inductive switching spikes, and reducing high-frequency oscillations.

If during operation of the motor e.g. the transistor 57 switches ON, a current flows from a1 to e1, and the stator pole 16 becomes a south pole, the stator pole 17 in contrast a north pole. In contrast, if the transistor 58 switches ON, a current flows from e2 to a2, i.e. the stator pole 16 becomes a north pole and the stator pole 17 a south pole. In the position shown in FIG. 1, in which the Hall-IC 25 faces a north pole of the rotor 11, the transistor 57 and, together with it, the wound conductor 20 are accordingly switched ON, and in the opposite case (south pole of the rotor 11 at the Hall-IC 25) the wound conductor 21, in order that the rotation direction 14 be established. When a north pole faces the Hall-IC 25, its output 50 becomes low, thus having approximately the potential of the minus line 35, and therefore the transistor 58 blocks and the transistor 57 becomes conductive. If on the other hand a south pole faces the Hall-IC 25, then the output 50 becomes high, namely positive, the transistor 58 becomes conductive and the transistor 57 blocks. Thus one can, with the one output signal at the output 50, activate the two transistors 57 and 58 in phase-opposed manner via the network 53 made up of passive elements.

As noted the Miller capacitors 59 and 60 reduce the speed of the switching operations. However in practice it has been shown that this reduction is less strongly effective for the switching-ON operation than for the switching-OFF operation and that, as a result of this, problems can develop in a surprising manner.

Figure 3:
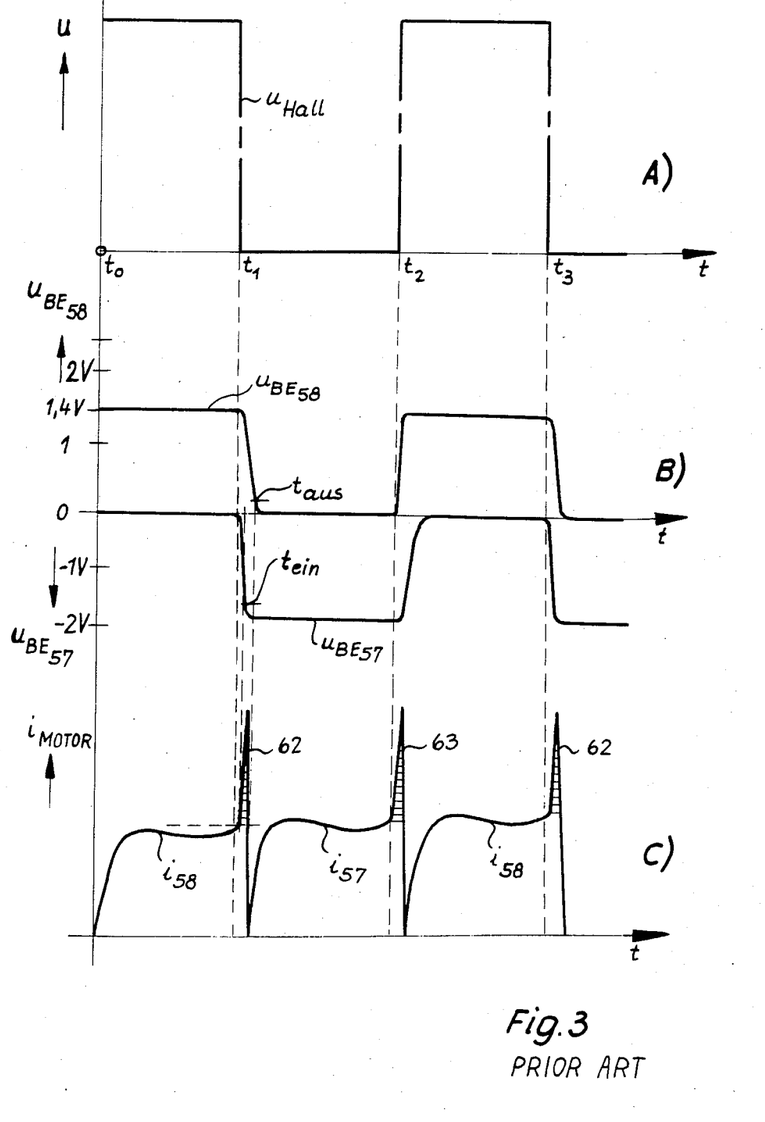
FIG. 3 presents explanatory diagrams for explaining the manner of operation of the motor of FIG. 2.

In this connection reference is made to FIG. 3. The latter shows at A) the Hall voltage $u_{Hall}$ at the terminal 50. If the motor of FIG. 2 is operated with e.g. 12 V, then this Hall voltage jumps between approximately 12 V and 0 V, depending upon the position of the rotor 11. E.g. at the points in time t1 and t3 it jumps from 12 V to 0 V, and at the point in time t2 from 0 V to 12 V. The points in time t0, t1, t2, t3 each have equal intervals of 180°-el., with reference to the rotation of the rotor 11.

FIG. 3B depicts the base-emitter voltages $u_{BE}$ of the transistors 57 and 58. As can be recognized, between the points in time t0 and t1 the transistor 58 is conductive, inasmuch as its base-emitter voltage amounts to 1.4 V, because the Hall voltage $u_{Hall}$ has a high value. Simultaneously, the transistor 57 is non-conductive. At the point in time t1 $u_{Hall}$ jumps to zero, and the voltage $u_{BE58}$ goes to zero with a delay effected by the Miller capacitor 60. When this voltage has reached 10% of its previous value, the point in time $t_{aus}$ is reached, at which the transistor 58 is switched OFF.

On the other hand, at the point in time t1 the base-emitter voltage of the transistor 57 begins to become more negative, and indeed rather quickly, so that already after a short time $t_{ein}$ it has reached 90% of its full value, upon which the transistor 57 becomes switched ON.

The point in time $t_{ein}$ thus occurs before time $t_{aus}$, i.e. the slope du/dt of the switch-ON curve $u_{BE57}$ is steeper than that of the switch-OFF curve $u_{BE58}$ at time t1, and thereafter the two transistors 57 and 58 are briefly simultaneously conductive.

Inasmuch as the two wound conductors 20 and 21 are inductively coupled with each other, the switching ON of the conductor 20 at time $t_{ein}$ effects a reduction of the magnetic flux in the stator 15 and, inasmuch as this flux endeavors to stay constant, this reduction effects a corresponding rise of the current $i_{58}$ through the transistor 58 and the conductor 21, in order to counteract this effect. As a result of this, there are produced high current spikes 62, 63 upon performance of the switching-OFF operation, as shown in FIG. 3C, and these current spikes can achieve values up to twice the start-up current, i.e. the current that is limited by means of the ohmic resistance of the respective wound conductor. These current spikes can, among other things, produce radio interference and are therefore extremely undesirable.

The invention eliminates these current spikes with a very simple technique.

Figure 4:
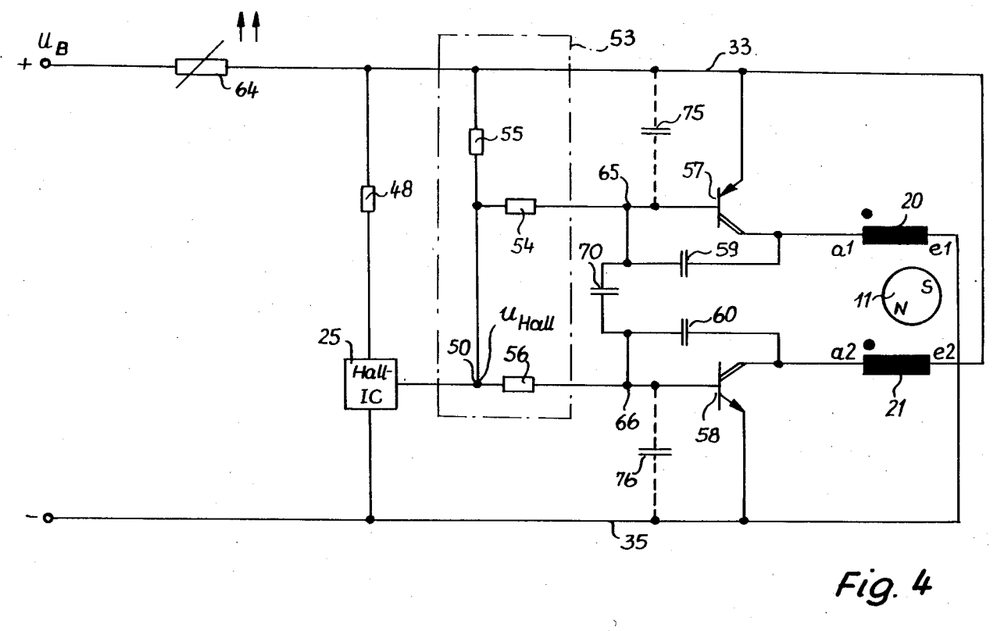
FIG. 4 depicts the construction of the inventive circuit for controlling the commutation of a two-conductor motor, e.g. the motor of FIG. 1.

FIG. 4 depicts a circuit of an inventive motor. Elements which are the same as in FIG. 2 or functionally equivalent are denoted with the same reference characters as there and are generally not described again.

Instead of the diode 47 of FIG. 2 (or in addition to it), there is provided in FIG. 4 a PTC-resistor 64 whose purpose is to render the motor currentless upon stalling of the rotor 11. The Hall-IC 25 of the circuit of FIG. 4 has a built-in voltage-stabilizing circuit, so that the zener diode 49 of FIG. 2 can be dispensed with.

The network 53, made up of passive elements, has an output 65 which leads to the control electrode of the Darlington transistor 57, which serves as a semiconductor control element. The network 53 furthermore has an output 66 which leads to the control electrode of the Darlington transistor 58, which likewise serves as a semiconductor control element.

Between these outputs is provided a coupling capacitance 70 whose purpose is to effect A.C.-coupling of these outputs and to make the potential variations at the outputs 65 and 66 (and thus at the control electrodes of the two transistors 57 and 58) as similar to each other as possible. These potential variations at the two outputs 65, 66 are both the result of the changes in value of the Hall signal $u_{Hall}$ at the output 50 and therefore tend to correspond to each other; however, because the resistors 54 and 56 are of relatively high resistance, the potential variations at the bases of transistors 57 and 58 do not correspond to each other perfectly. Namely, when the Hall voltage jumps to about $+U_B$, e.g. 12 V, to render transistor 58 conductive, the incidentally required charging-up of Miller capacitor 60 occurs via the high resistance of resistor 56, but from a voltage source point 50 that is at 12 V, and thus with a high charging current; in contrast, when the Hall voltage drops down to about 0 V to render transistor 58 non-conductive, the incidentally required discharging of charged-up Miller capacitor 60 likewise occurs via high-resistance resistor 56, but the left terminal of resistor 56 is now near to 0 V and the potential at the right electrode of Miller capacitor 60 is initially not much higher than that, e.g. about 1.4 V, so that the discharge current is initially about one tenth the charging current and thus the discharge requires a greater time than the charging. Accordingly, the high resistance values of resistors 54, 56, in combination with the Miller feedback potentials at the bases, causes the base potential of the OFF-going transistor to change comparatively slowly and the base potential of the ON-going transistor to change comparatively quickly in response to the self-same change in the value of the Hall output signal. Tests have shown that coupling capacitance 70 can have values in the range of several hundred pF up to 1 μF, thus within a range of magnitude of at least 1:1000, without essential change of function. According to present knowledge values in the nF order of magnitude are optimal, i.e. for example 3–5 nF. Such values can be realized by means of ceramic capacitors, whose lifetime is very long. Too high capacitance values lead, by virtue of the charging operation occurring upon switching ON, to the two transistors 57 and 58 becoming for a while simultaneously conductive, which, in some circumstances, can lead to difficulties upon start-up. Also, in the event of fluctuations of the operating voltage $U_B$, corresponding charging or discharging processes can appear in the coupling capacitance 70, which in the event of too high capacitance values for capacitor 70 likewise tend to produce malfunction. The Miller capacitors 59 and 60 preferably have values in the range of about 100 to about 220 pF. Below 100 pF one scarcely any more obtains the desired delay in the switching, and in the event of high capacitance values (from approximately 500 pF) the danger of current spikes is substantially greater.

Figure 5:
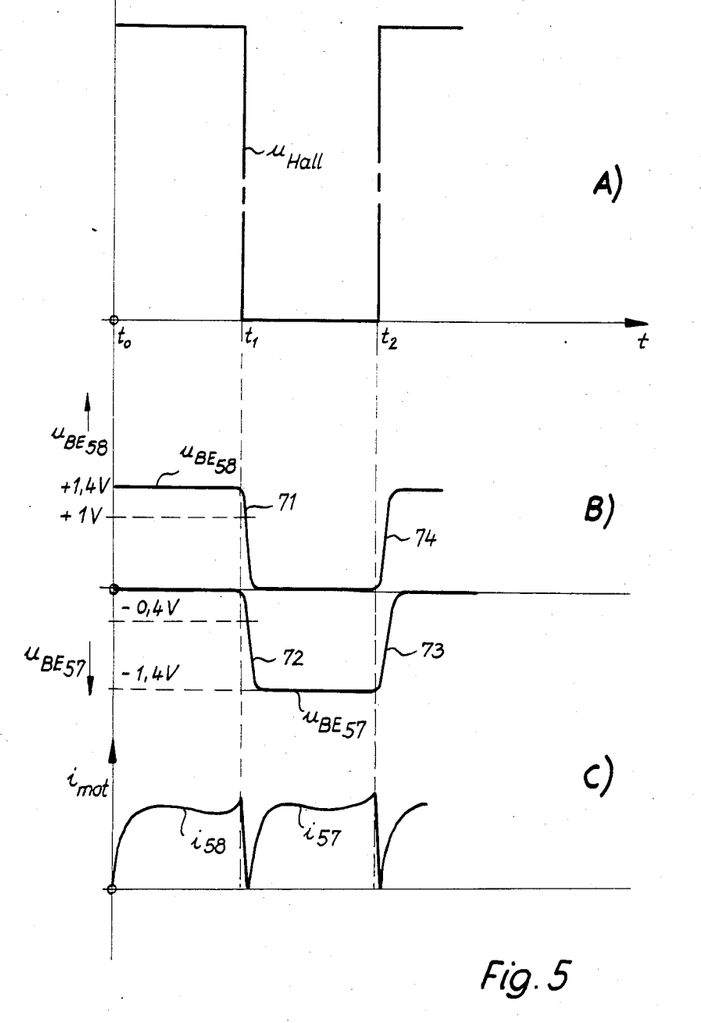
FIG. 5 presents explanatory diagrams for explaining the manner of operation of the circuit of FIG. 4.

FIG. 5 sets forth the manner of operation of the coupling capacitance 70. FIG. 5A depicts—like FIG. 3A—the Hall voltage at the output 50 of the Hall-IC 25. The latter jumps at time t1 e.g. from plus 12 V to 0 V. As a result the base-emitter voltage $u_{BE58}$ of the hitherto conductive transistor 58 drops and, in particular, delayed by the Miller capacitor 60. Simultaneously the base-emitter voltage $u_{BE57}$ of the transistor 57 becomes more negative, likewise delayed by means of the Miller capacitor 59.

By means of the coupling capacitance 70 there is produced now a substantially parallel variation of the decreasing branch 71 of $u_{BE58}$ and of the rising, i.e. increasingly more negative, branch 72 of $u_{BE57}$. Expressed in another way, at any point in time the branches 71 and 72 have approximately the same du/dt, and they differ from each other practically only to the extent of a D.C. voltage, namely the voltage across the coupling capacitance 70, which during this short time interval cannot substantially change. This applies in the same way to the branches 73 and 74 upon the switching OFF of the transistor 57 and the switching ON of the transistor 58 at time t2.

By virtue of this parallelism of the base voltage variation, the currents $i_{57}$ and $i_{58}$ are prevented from having noteworthy current spikes upon switching OFF, as FIG. 5C shows. By means of this simple expedient one manages to very substantially reduce interference voltages, because the two transistors 57 and 58 cannot any more be for a while simultaneously conductive upon commutation. When e.g. the voltage $u_{BE58}$ has dropped from 1.4 V to 1 V, so that the transistor 58 blocks, the voltage $u_{BE57}$ has in accordance with FIG. 5B only just reached −0.4 V, i.e. the transistor 57 is at this point in time still not conductive. There according develops a—very desirable—current gap at the commutation time. At the point in time at which the voltage $u_{Hall}$ changes, also the current in the conductive transistor begins to drop, as FIG. 5C shows.

Furthermore with the circuit of FIG. 4 one can omit the storage capacitor 45, which is necessary in the circuit of FIG. 2 and which, there, can in practice possibly limit the lifetime of the motor, as was set forth further above. With FIG. 4, by virtue of the relatively slow switching-OFF operations of the transistors 57 and 58, it is achieved that upon switching OFF, liberated inductive energy of the conductors 20, 21 is converted into heat in the transistors while they are switching OFF, and from the latter is dissipated in conventional manner via cooling bodies, or the like. Specifically, inasmuch as the current's rate of change di/dt during the switching OFF is relatively small, the induced voltage is also small, so that e.g. the voltage of the free-wheeling diode in the respective transistor is not even reached. (Cf. the free-wheeling diodes 57' and 58' shown in FIG. 2.) Accordingly these diodes are not needed. The energy to be dissipated is converted into heat during the relatively slowly occurring switching-OFF operation of the respective transistor—heat is developed during this operation in any event. This occurs without undesirable breakdown in the respective transistor, i.e. without detrimental effect upon lifetime, and without zener effects and their highly disturbing current pulses which could produce high-frequency interference.

For an operating voltage $U_B$ of 24 V there results for FIG. 4 the following values:
  resistor 5: PTC-resistor
  Hall-IC 25: Sprague UGN 3016
  resistor 48: 750 ohms
  resistor 55: 1.6 kohms
  resistors 54, 56: 27 kohms
  capacitors 59, 60: 150 pF
  capacitor 70: 4.7 nF
  transistor 57: BD 680
  transistor 58: BD 679

The motor in this embodiment is a four-pole motor with a one-phase, bifilar winding corresponding to FIG. 2 of DE-OS No. 28 35 210, rotary speed 3000 rpm, power consumption ca. 5 W.

The circuit of FIG. 4 can be constructed extraordinarily small. E.g. the resistors can be constructed as flat thick-layer resistors and the circuit elements can be arranged on a circular annular carrier with an outer diameter of 43 mm and an inner diameter of 22 mm. Including the Darlington transistors 57 and 58, such a carrier then has a thickness of only 4 mm, only the Hall-IC 25 and the PTC resistor 64 projecting beyond the latter a couple of mm. This makes possible the construction of extraordinarily compact motors with a very long lifetime, inasmuch as the ceramic capacitors 59, 60 and 70 have a long lifetime even at the high operating temperatures of a motor.

In many cases even one of the capacitors 59 and 60 can be omitted, inasmuch as e.g. via the relatively large coupling capacitance 70 e.g. the capacitor 59 is effective also for the transistor 58, and by virtue of the coupling capacitance 70 the potentials at the outputs 65 and 66 are anyway clamped. The conductors 20 and 21 can in accordance with the invention be inductively coupled more or less strongly. Instead of the Hall-IC 25 one can employ any equivalent sensor, namely any rotor-position-signal generator having a high output-voltage variation, e.g. at the output of an intermediately connected transistor which amplifies a rotor-position signal of low voltage variation and thus furnishes a signal with a high voltage variation. Self-evidently, the invention is suitable in the same way for two-phase, four-conductor motors or three-phase six-conductor motors, the circuit then needing to be doubled or tripled, as is familiar to the skilled person. However, the preferred application is one-phase, two-conductor motors, such as shown in the exemplary embodiment. Instead of the Miller capacitors 59 and 60 one can alteratively employ delay capacitors 75, 76 connected between base and emitter of the transistors 57 or 58. However, the solution with at least one Miller capacitor 59 or 60 is preferred, inasmuch as one requires smaller capacitors for it. Alternatively, the switching delay can be implemented by inserting a delay capacitor in FIG. 4, between the point 50 and the minus line 35, it then being advantageous to insert a resistor between the point 50 and the output of the Hall-IC 25 in order to make the delay approximately equally great for the positive and the negative flanks of the Hall signal. What seems important is that there be present, somewhere, a switching delay which then, by means of the coupling capacitance 70, is made to be effective in the same way for both transistors 57 and 58, irrespective of which of these two is the ON-going transistor and which is the OFF-going transistor.

Despite its extremely simple construction and small volume, the inventive circuit fulfills all the requirements of a high-quality commutation arrangement. Furthermore, a motor having this circuit can be regulated in a very simple way, e.g. in the case of a fan by means of a series-connected NTC-resistor in order to obtain at lower temperatures a lower rotary speed for the fan whereas with increasing temperature the fan's rotary speed increases.

I claim:

1. A brushless d.c. motor having a permanent-magnet rotor and a wound stator, the stator being provided with a stator winding comprising first conductor and second conductor means which are to be energized in alternation to each other to establish, alternately, a stator flux of a respective first and a stator flux of a respective second polarity at the part of the stator associated with that stator-winding phase,
  first and second power-supply lines connectable to a D.C. power source,
  first and second semiconductor control means for each such stator-winding phase and being of opposite respective conductivity types and each having a respective main current path with two end terminals and a respective control input,
  the main current path of the first semiconductor control means and the first conductor means of the respective stator-winding phase being connected together between the first and second power-supply lines such that the first semiconductor control means when conductive or ON carries current of the first conductor means,
  the main current path of the second semiconductor control means and the second conductor means of the respective stator-winding phase being connected together between the first and second power-supply lines such that the second semiconductor control means when conductive or ON carries current of the second conductor means,
  rotor-position sensing means operative for producing at a single output a rotor-position signal that assumes a first value when the turning rotor reaches a predetermined first angular position and a second value when the turning rotor reaches a predetermined second angular position, one of said values being a relatively high value and the other being a relatively low value,
  connecting means connecting said single output of said rotor-position senisng means to said first and second control inputs
    such that, when the rotor-position signal changes from the low to the high value thereof, first and second control-input signals respectively present at said first and second control inputs both assume in response thereto predetermined relatively high values causing the first semiconductor control means to be rendered conductive or ON and the second non-conductive or OFF
    and such that, when the rotor-position signal changes from the high to the low value thereof, the first and second control-input signals both assume in response thereto predetermined relatively low values causing the first semiconductor control means to be rendered non-conductive or OFF and the second conductive or ON,
  and wherein, in the absence of compensating means recited below,
    said first signal exhibits a tendency to reach said predetermined relatively high value thereof more quickly than does said second signal,
    and likewise said second signal exhibits a tendency to reach said predetermined relatively low value thereof more quickly than does said first signal,
    as a result of which each of the two semiconductor control means exhibits a tendency to be rendered conductive or ON more quickly than the other semiconductor control means is being rendered non-conductive or OFF,
  and compensating means connected to the control inputs of said first and second semiconductor control means and
    upon a change of said rotor-position signal from said low to said high value thereof, operative for slowing the rate at which said first signal reaches said predetermined relatively high value in dependence upon the speed at which the second signal reaches said predetermined relatively high value,
    and upon a change of said rotor-position signal from said high to said low value thereof, operative for slowing the rate at which said second signal reaches said predetermined relatively low value in dependence upon the speed at which the first signal reaches said predetermined relatively low value,
  whereby to counteract said tendency of each semiconductor control means to be rendered conductive or ON more quickly than the other semiconductor control means is being rendered non-conductive or OFF.

2. A motor as defined in claim 1,
  wherein the tendency of the ON-going semiconductor control means to be rendered ON more quickly than the OFF-going semiconductor control means is rendered OFF, results from the OFF-going semiconductor control means having present at its control input, at the time the rotor-position signal undergoes a change of value, a capacitively maintained initial signal value which must be dissipated away before the signal at the control input of the OFF-going semiconductor control means can reach the predetermined value that renders the OFF-going semiconductor control means non-conductive,
  said compensating means comprising means maintaining at the control input of the ON-going one of the two semiconductor control means a signal simulating said capacitively maintained initial signal value.

3. A motor as defined in claim 2,
  the semiconductor control means being provided with capacitive delay means connected thereto, operative for slowing the ON-to-OFF and OFF-to-ON changes of state of the semiconductor control means and minimizing the development of inductively produced voltage spikes by the first and second conductor means of the respective stator-winding phase,
  the capacitive delay means being connected to the semiconductor control means in such a fashion as to be responsible for said capacitively maintained initial signal value at the control input of the OFF-going one of the semiconductor control means, said compensating means comprising a single coupling capacitor connected betwen the control inputs of the first and second semiconductor control means and dimensioned to develop and maintain during motor operation a substantially constant potential difference between its two end terminals, the compensating means, and the first and second semiconductor means being connected and dimensioned such that the values of the first and second control-input signals at which the semiconductor control means are rendered conductive and the values at which the semiconductor control means are rendered non-conductive are so established that said compensating means, in constraining the first and second control-input signals to vary at least approximately identically, additionally causes the OFF-going semiconductor control means to be rendered non-conductive before the ON-going semiconductor control means is rendered conductive, thereby establishing a currentless interval coinciding with the commutation of the first and second conductor means of the respective stator-winding phase.

4. A motor as defined in claim 3, the first and second semiconductor control means each being connected and dimensioned such that, as the OFF-going semiconductor control means is being rendered non-conductive it receives and converts into dissipated heat energy at least the predominant part of the energy inductively stored in a respective one of the first and second conductor means and being able to do so without being damaged by virtue of said slowing of said changes of state effected by said capacitive delay means and by virtue of the ON-going semiconductor control means not becoming conductive until after said currentless interval established by said coupling capacitor.

5. A motor as defined in claim 1, wherein the tendency of the ON-going semiconductor control means to be rendered ON more quickly than the OFF-going semiconductor control means is rendered OFF, results from the OFF-going semiconductor control means having present at its control input, at the time the rotor-position signal undergoes a change of value, a capacitively maintained initial signal value which must be dissipated away before the signal at the control input of the OFF-going semiconductor control means can reach the predetermined value that renders the OFF-going semiconductor control means non-conductive, said compensating means comprising means constraining the signal at the control input of the ON-going one of the two semiconductor control means to vary at least approximately identically to the signal at the control input of the OFF-going one of the semiconductor control means during the time that the capacitively maintained initial signal value at the control input of the OFF-going semiconductor control means is being dissipated away.

6. A motor as defined in claim 5, the compenating means, and the first and second semiconductor means being connected and dimensioned such that the values of the first and second control-input signals at which the semiconductor control means are rendered conductive and the values at which the semiconductor control means are rendered non-conductive are so established that said compensating means, in constraining the first and second control-input signals to vary at least approximately identically, additionally causes the OFF-going semiconductor control means to be rendered non-conductive before the ON-going semiconductor control means is rendered conductive, thereby establishing a currentless interval coinciding with the commutation of the first and second conductor means of the respective stator-winding phase.

7. A motor as defined in claim 6, the semiconductor control means being provided with capacitive delay means connected thereto, operative for slowing the ON-to-OFF and OFF-to-ON changes of state of the semiconductor control means and minimizing the development of inductively produced voltage spikes by the first and second conductor means of the respective stator-winding phase, the capacitive delay means being connected to the semiconductor control means in such a fashion as to be responsible for said capacitively maintained initial signal value at the control input of the OFF-going one of the semiconductor control means, the first and second semiconductor control means each being connected and dimensioned such that, as the OFF-going semiconductor control means is being rendered non-conductive, it receives and converts into dissipated heat energy at least the predominant part of the energy inductively stored in a respective one of the first and second conductor means and being able to do so without being damaged by virtue of said slowing of said changes of state effected by said capacitive delay means not becoming conductive until after said currentless interval established by said compensating means.

8. A motor as defined in claim 5, said constraining means comprising means enforcing a substantially constant difference between the signals at the control inputs of the first and of the second semiconductor control means.

9. A motor as defined in claim 8, said enforcing means comprising circuit element means having two end terminals and exhibiting a substantially constant potential difference between its two end terminals, each end terminal being connected to the control input of a respective one of said first and second semiconductor control means.

10. A motor as defined in claim 9, said circuit element means comprising a single coupling capacitor connected between the control inputs of the first and second semiconductor control means and dimensioned to develop and maintain during motor operation a substantially constant potential difference between its two end terminals.

11. A motor as defined in claim 10, said single coupling capacitor having a value between about $10^{-10}$ and $10^{-6}$ F.

12. A motor as defined in claim 11, said single coupling capacitor having a value between about $10^{-9}$ and $10^{-8}$ F.

13. A motor as defined in claim 1, the semiconductor control means being provided with capacitive delay means connected thereto operative for slowing the ON-to-OFF and OFF-to-ON changes of state of the semiconductor control means and minimizing the development of inductively produced voltage spikes by the first and second conductor means of the respective stator-winding phase,
the capacitive delay means being connected to the semiconductor control means in such a fashion as to be the cause of said tendency of each semiconductor control means to be rendered conductive more quickly than the other semiconductor control means is being rendered non-conductive.

14. A motor as defined in claim 13,
the capacitive delay means comprising at least one Miller capacitor connecting one of the main-current-path end terminals of a respective one of the semiconductor control means to the control input thereof and forming at least part of a negative-feedback branch for the respective one of the semiconductor control means.

15. A motor as defined in claim 13,
the capacitive delay means comprising at least one capacitor connecting the control input of a respective one of the semiconductor control means to a respective one of the first and second power-supply lines.

16. A motor as defined in claim 1,
the semiconductor control means being provided with capacitive delay means connected thereto operative for slowing the ON-to-OFF and OFF-to-ON changes of state of the semiconductor control means and minimizing the development of inductively produced voltage spikes by the first and second conductor means of the respective stator-winding phase,
the capacitive delay means being connected to the semiconductor control means in such a fashion as to be the cause of said tendency of each semiconductor control means to be rendered conductive more quickly than the other semiconductor control means is being rendered non-conductive,
the first and second semiconductor control means each being connected and dimensioned such that, as it is being rendered non-conductive, it receives and converts into dissipated heat energy at least the predominant part of the energy inductively stored in a respective one of the first and second conductor means and being able to do so without being damaged by virtue of said slowing of said changes of state effected by said capacitive delay means.

17. A motor as defined in claim 16,
the capacitive delay means comprising at least one Miller capacitor connecting one of the main-current-path end terminals of a respective one of the semiconductor control means to the control input thereof and forming at least part of a negative-feedback branch for the respective one of the semiconductor control means.

18. A motor as defined in claim 16,
the capacitive delay means comprising at least one capacitor connecting the control input of a respective one of the semiconductor control means to a respective one of the first and second power-supply lines.

19. A motor as defined in one of claims 2, 5 or 10,
the semiconductor control means being provided with capacitive delay means connected thereto operative for slowing the ON-to-OFF and OFF-to-ON changes of state of the semiconductor control means and minimizing the development of inductively produced voltage spikes by the first and second conductor means of the respective stator-winding phase,
the capacitive delay means being connected to the semiconductor control means in such a fashion as to be responsible for said capacitively maintained signal value at the control input of the OFF-going one of the semiconductor control means.

20. A motor as defined in claim 19,
the capacitive delay means comprising at least one Miller capacitor connecting one of the main-current-path end terminals of a respective one of the semiconductor control means to the control input thereof and forming at least part of a negative-feedback branch for the respective one of the semiconductor control means.

21. A motor as defined in claim 19,
the capacitive delay means comprising at least one capacitor connecting the control input of a respective one of the semiconductor control means to a respective one of the first and second power-supply lines.

22. A motor as defined in one of claims 2, 5 or 10,
the semiconductor control means being provided with capacitive delay means connected thereto operative for slowing the ON-to-OFF and OFF-to-ON changes of state of the semiconductor control means and minimizing the development of inductively produced voltage spikes by the first and second conductor means of the respective stator-winding phase,
the capacitive delay means being connected to the semiconductor control means in such a fashion as to be responsible for said capacitively maintained initial signal value at the control input of the OFF-going one of the semiconductor control means,
the first and second semiconductor control means each being connected and dimensioned such that, as it is being rendered non-conductive, it receives and converts into dissipated heat energy at least the predominant part of the energy inductively stored in a respective one of the first and second conductor means and being able to do so without being damaged by virtue of said slowing of said changes of state effected by said capacitive delay means.

23. A motor as defined in claim 22,
the capacitive delay means comprising at least one capacitor connecting the control input of a respective one of the semiconductor control means to a respective one of the first and second power-supply lines.

24. A motor as defined in claim 22,
the capacitive delay means comprising at least one Miller capacitor connecting one of the main-current-path end terminals of a respective one of the semiconductor control means to the control input thereof and forming at least part of a negative-feedback branch from the respective one of the semiconductor control means.

25. A motor as defined in one of claims 10, 11 or 12,
the semiconductor control means being provided with capacitive delay means connected thereto and operative for slowing down the ON-to-OFF and OFF-to-ON changes of state of the semiconductor control means and minimizing the development of inductively produced voltage spikes by the first and second conductor means of the respective stator-winding phase, said capacitive delay means being responsible for said capacitively maintained intial signal value at the control input of the OFF-going one of the semiconductor control means, the capacitive delay means comprising at least one Miller capacitor connecting one of the main-current-path end terminals of a respective one of the semiconductor control means to the control input thereof and forming at least part of a negative-feedback branch for the respecitve one of the semiconductor control means, the at least one Miller capacitor having a smaller capacitance value than said coupling capacitor.

26. A motor as defined in claim 25, said smaller capacitance value being in the range from about 100 to about 400 pF.

27. A motor as defined in claim 26, said smaller capacitance value being approximately 150 pF.

* * * * *